United States Patent
Preidel

(10) Patent No.: US 9,805,848 B2
(45) Date of Patent: Oct. 31, 2017

(54) SURGE ARRESTER FOR HIGH VOLTAGES

(71) Applicant: SIEMENS AKTIENGESELLSCHAFT, Munich (DE)

(72) Inventor: Axel Preidel, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 14/408,763

(22) PCT Filed: May 31, 2013

(86) PCT No.: PCT/EP2013/061229
§ 371 (c)(1),
(2) Date: Dec. 17, 2014

(87) PCT Pub. No.: WO2013/189714
PCT Pub. Date: Dec. 27, 2013

(65) Prior Publication Data
US 2015/0206630 A1  Jul. 23, 2015

(30) Foreign Application Priority Data
Jun. 19, 2012 (DE) .................. 10 2012 210 331

(51) Int. Cl.
| | |
|---|---|
| *H02H 9/00* | (2006.01) |
| *H01C 7/12* | (2006.01) |
| *G01K 5/48* | (2006.01) |
| *G01L 1/00* | (2006.01) |
| *H02H 9/04* | (2006.01) |
| *H01C 7/10* | (2006.01) |

(52) U.S. Cl.
CPC ............... *H01C 7/12* (2013.01); *G01K 5/48* (2013.01); *G01L 1/005* (2013.01); *H02H 9/04* (2013.01); *H01C 7/10* (2013.01)

(58) Field of Classification Search
CPC ........................................ H01C 7/12
USPC ........................................ 361/124
See application file for complete search history.

(56) References Cited

U.S. PATENT DOCUMENTS

| | | |
|---|---|---|
| 5,191,503 A | 3/1993 | Kawamura et al. |
| 5,325,087 A | 6/1994 | Mikli |
| 6,433,989 B1 | 8/2002 | Hinrichsen et al. |
| 7,540,658 B2 | 6/2009 | Toyoda et al. |
| 8,347,728 B2 * | 1/2013 | Aitken ............... H01L 22/12 73/760 |

(Continued)

FOREIGN PATENT DOCUMENTS

| | | |
|---|---|---|
| CN | 1261980 A | 8/2000 |
| CN | 201867268 U | 6/2011 |
| CN | 102231478 A | 11/2011 |

(Continued)

*Primary Examiner* — Stephen W Jackson
(74) *Attorney, Agent, or Firm* — Laurence Greenberg; Werner Stemer; Ralph Locher

(57) ABSTRACT

An overvoltage arrester for high voltages having a high-voltage terminal that is connected to an arrester block forming a nonlinear resistor, and a temperature sensor for detecting the temperature of the arrester block. In order to enable a simple and reliable detection of the temperature of the arrester block continually during the operation thereof, the temperature sensor detects a change of the longitudinal extent of the arrester block.

7 Claims, 1 Drawing Sheet

(56) References Cited

U.S. PATENT DOCUMENTS 8,582,264 B2 11/2013 Durth et al.
2011/0194222 A1 8/2011 Durth et al.

FOREIGN PATENT DOCUMENTS

| DE | 840641 C | 6/1952 |
| DE | 3632224 A1 | 4/1988 |
| DE | 69121702 T2 | 4/1997 |
| DE | 102007034756 A1 | 1/2008 |
| DE | 102010038208 A1 | 4/2012 |
| JP | 2007335794 A | 12/2007 |

\* cited by examiner

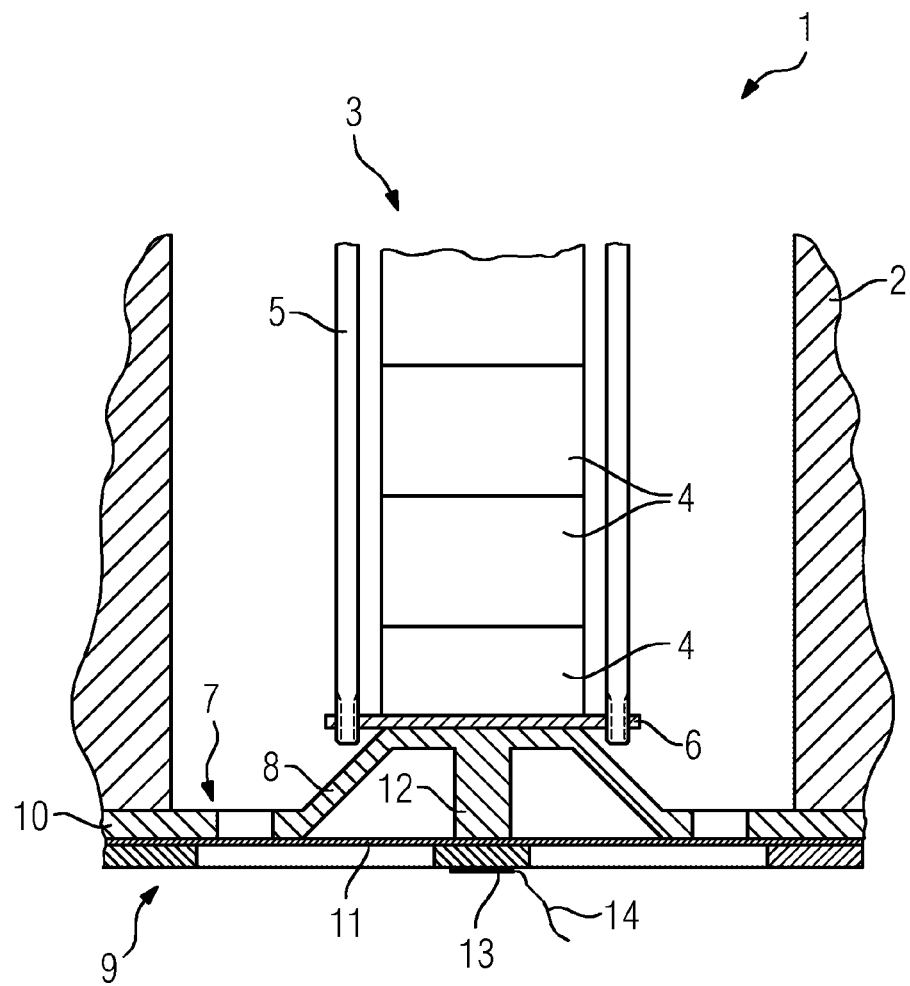

SURGE ARRESTER FOR HIGH VOLTAGES

BACKGROUND OF THE INVENTION

Field of the Invention

The invention relates to a surge arrester for high voltages comprising a high-voltage connection, which is connected to an arrester block which forms a nonlinear resistance, and comprising a temperature sensor for sensing the temperature of the arrester block.

Such a surge arrester is already known, for example, from DE 197 28 961 A1. The surge arrester disclosed therein is designed for high voltages or medium voltages and has a gas-tight encapsulating housing, in which an arrester block is arranged. The arrester block consists of cylindrical arrester elements which are stacked one on top of the other and are braced with one another by a tensioning apparatus. The cylindrical arrester elements form a nonlinear resistance and consist of zinc oxide, for example. In order to measure the temperature of the arrester block, a surface sensor is provided which senses the temperature of the arrester block.

DE 10 2010 038 208 A1 discloses a surge arrester in which a temperature threshold of the arrester block is sensed with the aid of a PTC or NTC thermistor.

The temperature measurement of an arrester block can be used for monitoring the state of aging of the surge arrester. The temperature of the arrester is changed by the ambient temperature and the voltage present at the arrester. Above a certain temperature, the surge arrester becomes thermally unstable unless the instantaneous loading, i.e. the voltage present at the surge arrester, is reduced. The respective point at which the thermal instability begins can be derived from a predetermined family of characteristics which has, inter alia, the arrester temperature as parameter. By virtue of the measurement of the temperature at the arrester block, the control of an installation in which the surge arrester is integrated can change the loading at the arrester in a suitable manner such that the surge arrester returns back to its thermally stable range.

The continuous monitoring of the temperature of the arrester block during its operation is involved, however. As already mentioned further above, it is known to use surface sensors for this purpose which are integrated in the arrester block. Infrared measurement of the arrester housing is also known from practice.

BRIEF SUMMARY OF THE INVENTION

The object of the invention consists in providing a surge arrester of the type mentioned at the outset which enables simple and reliable sensing of the temperature of the arrester block during its operation continuously.

The invention achieves this object by virtue of the fact that the temperature sensor senses the change in the longitudinal extent of the arrester block.

According to the invention, the temperature of the arrester block is sensed on the basis of its temperature-dependent length expansion. Checking the length expansion is a particularly simple and inexpensive possible way of sensing the temperature of the arrester block, which is generally at a high voltage, during its operation in comparison with the temperature measurement methods previously used.

The arrester block can be arranged in a gas-tight encapsulating housing. As a deviation from this, the surge arrester is a surge arrester without a housing.

Expediently, the temperature sensor has a strain gage or means for sensing a mechanical tension. The strain gage or the means for sensing a mechanical voltage is/are arranged on a component part on which the arrester block is supported with one of its ends. It is of course also possible for a rigid intermediate element to be provided between the component part on which the strain gage is fastened and the arrester block, which introduces the longitudinal expansion of the arrester block directly into an expansion or tensioning of the component part on which the strain gage or the means for sensing a mechanical tension is/are fastened. The latter are advantageously arranged on that end of the surge arrester, extending in a longitudinal direction, which is remote from the high-voltage connection.

As a deviation from this, it is possible within the scope of the invention for the temperature sensor to comprise a pressure pickup, on which the arrester block itself or a rigid transmission element rests, with the arrester block being supported on that end of the transmission element which is remote from the pressure pickup. The pressure pickup is, for example, a membrane or a pressure pickup plate. In accordance with this advantageous development, the longitudinal expansion of the arrester block is introduced into the pressure pickup, which thus expands or tensions. If the pressure pickup is an elastic membrane, this protrudes out in one direction in the case of a length expansion of the arrester block. This protuberance can be sensed in principle by any desired sensors. If the pressure pickup is a tensioning plate, the mechanical tension can be sensed by a strain gage, for example.

Advantageously, means for optically monitoring a protuberance, expansion or mechanical tension of the pressure pickup are provided. These optical means are, for example, a camera in which a length scale is integrated.

As a deviation from this, the pressure pickup can be arranged between a length scale and the camera, with the result that the length expansion can be read in a convenient manner using the contour of the pressure sensor mapped on the scale owing to this aligned arrangement between the camera, the pressure pickup and the length measurement scale.

It is preferred that the arrester block forms a stack of arrester elements, wherein tensioning elements for bracing the arrester elements are provided. The for example cylindrical arrester elements are manufactured from a material that expediently forms a nonlinear resistance. Expediently, the arrester elements are manufactured from a metal oxide, such as zinc oxide. The tensioning means consist of an electrically nonconductive material.

In accordance with a preferred configuration of the invention, the temperature measurement sensor is arranged at a point on the surge arrester which is close to the ground potential. In this case, the surge arrester has a high-voltage side, on which a high-voltage potential is present, and a side remote from the high-voltage side, which is connected to the ground potential. If the temperature measurement sensor is arranged at the end close to ground potential, generally complex insulation of the temperature measurement sensor at high-voltage potential with respect to a monitoring unit which is at a ground potential is not required. The monitoring unit is integrated in the regulation of an installation of which the surge arrester forms a part, for example.

Advantageously, the arrester block is a column of arrester elements, which are stacked one on top of the other and are braced with one another by tensioning means. The tensioning means consist of an electrically insulating material, such as of a plastic reinforced with glass fibers, for example. This tensioning composite structure is advantageously arranged in a gas-tight encapsulating housing. Prior to operation of the surge arrester, the tensioning composite structure can be calibrated, so that a certain (average) temperature can be assigned to each length expansion of the arrester block. A previously determined temperature profile of the arrester block allows the determination of the temperature from the length expansion of the column. As already mentioned, the change in length does not need to be measured directly in the arrester in the encapsulating housing. The effect can also be sensed via suitable transmission elements on the outer side of the surge arrester. The gas-tight encapsulating housing consists of porcelain, for example.

BRIEF DESCRIPTION OF THE SEVERAL VIEWS OF THE DRAWING

Further expedient configurations and advantages of the invention are the subject matter of the description below relating to exemplary embodiments of the invention with reference to the FIGURE in the drawing, in which the FIGURE shows an exemplary embodiment of the surge arrester according to the invention in a cross-sectional view.

DESCRIPTION OF THE INVENTION

The FIGURE shows a sectioned side view of an exemplary embodiment of the surge arrester 1 according to the invention. The surge arrester 1 has an encapsulating housing 2 (only illustrated schematically), in which an arrester block 3 is arranged. The encapsulating housing 2 is gas-tight and filled with an inert gas. The arrester block 3 consists of arrester elements 4, which are each configured cylindrically and are stacked one above the other to form a column. In order to brace the arrester elements 4 with respect to one another, a tensioning apparatus is used which consists of an electrically insulating material; of the tensioning apparatus, the FIGURE shows insulating rods 5, which extend between two tensioning plates, of which only the lower tensioning plate 6 is illustrated in the FIGURE, however.

The entire arrester block 3 rests on a first supporting ring 7, which has a dome-like central section 8. Furthermore, a second lower supporting ring 9 is provided, on which the first supporting ring 7 is supported with a flange section 10. A pressure relief membrane 11 is clamped between the flange sections 9 and 10.

In addition, it can be seen that the dome-like central section 8 of the first supporting ring 7 has a pin 12, with which a change in length of the arrester block 3 is introduced into the pressure membrane 11, which then forms a protuberance. This protuberance is sensed with the aid of a strain gage 13 fitted on the second supporting ring and is transmitted to a central monitoring unit (not illustrated in the FIGURE) at ground potential via a signal line 4. Owing to the transmitted data and a previously performed calibration, the temperature of the arrester block 3 can be determined from the measurement signals during operation of the surge arrester 1.

The strain gage is arranged on a side of the surge arrester 1 which is close to ground potential.

The invention claimed is:

1. A surge arrester for high voltages, comprising:
    an arrester block forming a nonlinear resistance;
    a high-voltage connection connected to said arrester block; and
    a temperature sensor for sensing a temperature of said arrester block, said temperature sensor sensing a change in a longitudinal extent of said arrester block, wherein said temperature sensor has a pressure pickup, said arrester block resting on said pressure pickup.

2. The surge arrester according to claim 1, wherein said temperature sensor has a strain gage or means for sensing a mechanical tension.

3. The surge arrester according to claim 1, further comprising means for optically monitoring a protuberance, expansion or tension of said pressure pickup.

4. The surge arrester according to claim 1,
    wherein said arrester block has a stack of arrester elements; and
    further comprising tensioning elements for bracing said arrester elements.

5. A surge arrester for high voltages, comprising:
    an arrester block forming a nonlinear resistance;
    a high-voltage connection connected to said arrester block; and
    a temperature sensor for sensing a temperature of said arrester block, said temperature sensor sensing a change in a longitudinal extent of said arrester block, wherein said temperature sensor is disposed at a point on the surge arrester which is close to ground potential.

6. The surge arrester according to claim 1, further comprising:
    a monitoring unit; and
    a signal line, said temperature sensor connected to said monitoring unit via said signal line.

7. A surge arrester for high voltages, comprising:
    an arrester block forming a nonlinear resistance;
    a high-voltage connection connected to said arrester block; and
    a temperature sensor for sensing a temperature of said arrester block, said temperature sensor sensing a change in a longitudinal extent of said arrester block;
    wherein said temperature sensor has a pressure pickup; and
    further comprising a rigid transmission element supporting said arrester block, said rigid transmission element resting on said pick up.

* * * * *